(12) United States Patent
Yang

(10) Patent No.: US 11,958,460 B2
(45) Date of Patent: Apr. 16, 2024

(54) METHOD OF CONTROLLING ELECTRONIC PARKING BRAKE

(71) Applicant: HYUNDAI MOBIS Co., Ltd., Seoul (KR)

(72) Inventor: Dong-Hyun Yang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 295 days.

(21) Appl. No.: 17/493,284

(22) Filed: Oct. 4, 2021

(65) Prior Publication Data

US 2022/0105910 A1 Apr. 7, 2022

(30) Foreign Application Priority Data

Oct. 7, 2020 (KR) .................. 10-2020-0129231

(51) Int. Cl.
| | |
|---|---|
| B60T 8/172 | (2006.01) |
| B60T 8/171 | (2006.01) |
| B60T 13/74 | (2006.01) |

(52) U.S. Cl.
CPC .............. B60T 8/172 (2013.01); B60T 8/171 (2013.01); B60T 13/74 (2013.01); B60T 2270/88 (2013.01)

(58) Field of Classification Search
CPC .......... B60T 8/172; B60T 8/171; B60T 13/74; B60T 2270/88
USPC ......................................................... 701/70
See application file for complete search history.

(56) References Cited

U.S. PATENT DOCUMENTS

| | | | | |
|---|---|---|---|---|
| 8,322,798 | B2 * | 12/2012 | Kondo .................. | B60T 13/741 701/70 |
| 2004/0201270 | A1 * | 10/2004 | Suzuki .................. | B60T 13/741 303/20 |
| 2009/0099748 | A1 * | 4/2009 | Watanabe ............. | B60T 13/746 701/70 |
| 2011/0153147 | A1 * | 6/2011 | Watanabe ............... | F16D 65/18 188/72.4 |
| 2011/0240418 | A1 * | 10/2011 | Tachiiri ................. | B60T 13/588 188/72.4 |
| 2011/0278108 | A1 * | 11/2011 | Watanabe ............... | B60T 7/042 188/72.3 |

(Continued)

Primary Examiner — Logan M Kraft
Assistant Examiner — John D Bailey
(74) Attorney, Agent, or Firm — Morgan, Lewis & Bockius LLP

(57) ABSTRACT

A method of controlling an electronic parking brake includes: an initiation determination process of determining whether to initiate an electronic parking brake (EPB) release operation based on whether a release signal is input; a calculation process of calculating a no-load release time and a minimum EPB release time when the EPB release operation is initiated; a no-load release time adjustment process of measuring a time of a no-load section based on a current flowing through a motor and adjusting the time of the no-load section by supplying the current to the motor until the time of the no-load section is equal to the calculated no-load release time; and a release process of determining whether a summed time of a time of a load section and the adjusted time of the no-load section satisfies the minimum EPB release time, and continuously supplying the current to the motor to supply the current to the motor until the summed time becomes equal to the EPB release time when the summed time is less than the minimum EPB release time.

7 Claims, 5 Drawing Sheets

(56) References Cited

U.S. PATENT DOCUMENTS

| | | | | |
|---|---|---|---|---|
| 2013/0116904 A1* | 5/2013 | Watanabe | ............... | F16D 65/18 |
| | | | | 188/18 A |
| 2013/0261917 A1* | 10/2013 | Kotake | ................ | F16D 65/183 |
| | | | | 701/70 |
| 2013/0275019 A1* | 10/2013 | Murata | ................... | B60T 7/22 |
| | | | | 701/70 |
| 2015/0077128 A1* | 3/2015 | Jeong | ..................... | B60T 17/22 |
| | | | | 324/433 |
| 2015/0145321 A1* | 5/2015 | Yuasa | ................... | B60T 8/172 |
| | | | | 303/3 |
| 2015/0166032 A1* | 6/2015 | No | ....................... | B60T 13/746 |
| | | | | 188/162 |
| 2015/0175137 A1* | 6/2015 | Murata | .................. | B60T 7/042 |
| | | | | 701/70 |
| 2015/0217743 A1* | 8/2015 | Blattert | ................. | B60T 7/122 |
| | | | | 701/70 |
| 2015/0217750 A1* | 8/2015 | Sussek | ................. | B60T 13/741 |
| | | | | 701/70 |
| 2015/0345580 A1* | 12/2015 | Jung | ..................... | B60T 13/02 |
| | | | | 188/162 |
| 2016/0032993 A1* | 2/2016 | Takei | .................... | F16D 65/18 |
| | | | | 188/162 |
| 2016/0103430 A1* | 4/2016 | Baehrle-Miller | ..... | F16D 55/226 |
| | | | | 188/162 |
| 2016/0176389 A1* | 6/2016 | Baehrle-Miller | ....... | B60T 8/172 |
| | | | | 701/70 |
| 2019/0135259 A1* | 5/2019 | Jo | .......................... | B60T 7/085 |
| 2021/0078557 A1* | 3/2021 | Kobune | ................ | B60T 13/741 |
| 2021/0284122 A1* | 9/2021 | Baehrle-Miller | ....... | H02P 23/24 |
| 2022/0032894 A1* | 2/2022 | Park | ..................... | B60T 13/588 |

\* cited by examiner

| CLAMPING FORCE | RELEASE FLUID PRESSURE | RELEASE TIME | AIR GAP(mm) |
|---|---|---|---|
| 8.5A | 4bar | 1.35s | 0.63 |
| | 10bar | 1.29s | 0.56 |
| | 20bar | 1.24s | 0.50 |
| | 30bar | 1.2s | 0.46 |
| | 40bar | 1.18s | 0.44 |
| | 50bar | 1.17s | 0.43 |
| | 60bar | 1.16s | 0.42 |
| | 70bar | 1.16s | 0.42 |
| | 80bar | 1.16s | 0.42 |
| 6A | 2bar | 1.25s | 0.63 |
| | 10bar | 1.17s | 0.51 |
| | 20bar | 1.16s | 0.49 |
| | 30bar | 1.16s | 0.49 |
| | 80bar | 1.16s | 0.49 |
| 4A | 2bar | 1.16s | 0.49 |

FIG. 4

METHOD OF CONTROLLING ELECTRONIC PARKING BRAKE

CROSS-REFERENCE TO RELATED APPLICATION

This application claims the benefit of priority to Korean Patent Application No. 10-2020-0129231, filed on Oct. 7, 2020 in the Korean Intellectual Property Office, the disclosure of which is incorporated herein by reference in its entirety.

TECHNICAL FIELD

An embodiment of the present disclosure relates to a method of controlling an electronic parking brake.

BACKGROUND

The contents described in this section simply provide background information on the present disclosure, and do not constitute the related art.

A conventional electronic parking brake (EPB) is integrally installed with a caliper of a vehicle mainly using a disc brake. A hydraulic piston, which receives hydraulic pressure and moves back and forth to bring a brake pad into close contact with a disk to generate a frictional braking force, is installed in the caliper. A motor, which is a power source configured to generate power, is integrally installed with a body of the caliper, and an EPB piston or the like, which generates a parking braking force by pressing the hydraulic piston while linearly reciprocating by driving the motor, is provided.

FIG. 5 is a set of graphs illustrating a conventional electronic parking brake release process in terms of time and current.

Referring to FIG. 5, FIG. 5A is a graph illustrating an EPB release time in a case in which a release fluid pressure of a main brake is small, for example, the release fluid pressure is 2 bar when an operation of releasing the electronic parking brake is initiated. On the other hand, FIG. 5B is a graph illustrating the EPB release time in a case in which the release fluid pressure of the main brake is large, for example, the release fluid pressure is 80 bar when the operation of releasing the electronic parking brake is initiated.

Section A refers to a load release time, and section B refers to a no-load release time. The EPB release time refers to a time obtained by summing section A and section B.

In order to adjust the EPB release time, the conventional electronic parking brake sets the no-load release time, that is, section B, to be maintained for a predetermined time. However, in the conventional electronic parking brake, when the release fluid pressure is increased, for example, when the release fluid pressure is increased from 2 bar to 80 bar, the load release time, that is, section A is shortened, thereby reducing the EPB release time.

When the EPB release time is reduced, an excessive drag torque is generated between a brake pad and a brake disc, which are friction materials, because the EPB piston does not move back sufficiently when the electronic parking brake is released, and thus there is a problem of causing a decrease in fuel efficiency of a vehicle and premature wear of the brake pad.

SUMMARY

According to one embodiment of the present disclosure, when an electronic parking brake is released, a motor is rotated to move a piston back until a no-load release time is maintained for a predetermined time or longer, and an electronic parking brake (EPB) release time is maintained for a predetermined time or longer, thereby securing a sufficient air gap between a brake pad and a brake disc. The present disclosure is directed to improving fuel efficiency of a vehicle and preventing premature wear of a brake pad by securing a sufficient air gap to eliminate drag torque.

According to at least one aspect, the present disclosure provides a method of controlling an electronic parking brake, the method comprising: an initiation determination process of determining whether to initiate an electronic parking brake (EPB) release operation based on whether a release signal is input; a calculation process of calculating a no-load release time and a minimum EPB release time when the EPB release operation is initiated; a no-load release time adjustment process of measuring a time of a no-load section based on a current flowing through a motor and adjusting the time of the no-load section by supplying the current to the motor until the time of the no-load section is equal to the calculated no-load release time; and a release process of determining whether a summed time of a time of a load section and the adjusted time of the no-load section satisfies the minimum EPB release time, and continuously supplying the current to the motor to supply the current to the motor until the summed time becomes equal to the EPB release time when the summed time is less than the minimum EPB release time.

BRIEF DESCRIPTION OF THE DRAWINGS

The above and other objects, features, and advantages of the present disclosure will become more apparent to those of ordinary skill in the art by describing exemplary embodiments thereof in detail with reference to the accompanying drawings, in which:

FIG. 4 is a table illustrating situations of an air gap, which is generated in the electronic parking brake, according to a magnitude of each of a clamping force and a release fluid pressure when the no-load release time is not adjusted.

DETAILED DESCRIPTION OF EXEMPLARY EMBODIMENTS

Figure 1:
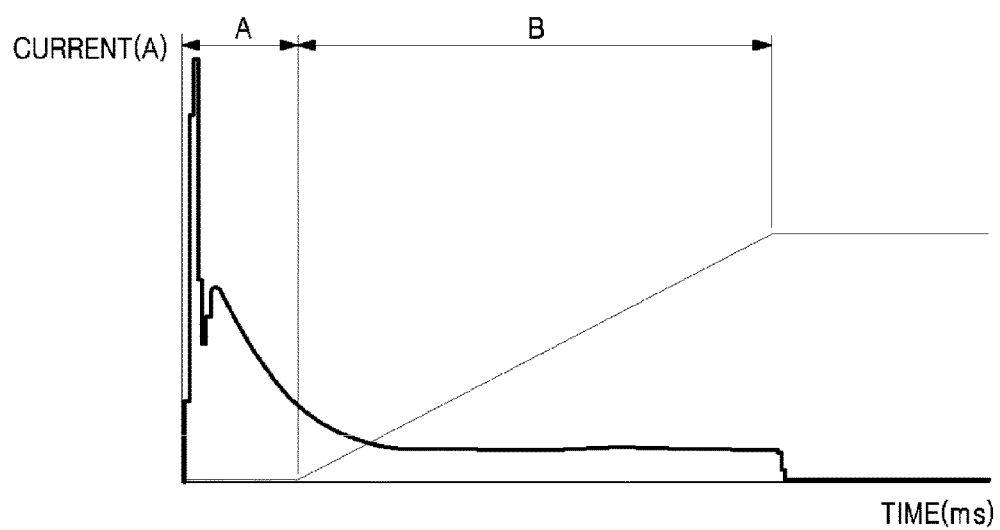
FIG. 1 is a graph illustrating an electronic parking brake (EPB) release process according to one embodiment of the present disclosure in terms of time and current.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a graph illustrating an electronic parking brake (EPB) release process according to one embodiment of the present disclosure in terms of time and current.

Referring to FIG. 1, section A refers to a load release time, and section B refers to a no-load release time. An EPB release time refers to time obtained by summing section A and section B.

In a method of controlling the electronic parking brake according to one embodiment of the present disclosure, in controlling the EPB release time, an operation of releasing the electronic parking brake is maintained until predetermined two conditions are satisfied. Here, the predetermined two conditions refer to a condition for satisfying the no-load release time and a condition for satisfying a minimum EPB release time, in an electronic parking brake release process.

In the method of controlling the electronic parking brake according to one embodiment of the present disclosure, the operation of releasing the electronic parking brake is maintained until a condition, in which the no-load release time, that is, section B is maintained for a predetermined time or longer, is satisfied and a condition, in which the EPB release time, for example, the time obtained by summing section A and section B, is maintained for the minimum EPB release time or longer, is satisfied, so that a sufficient air gap is secured between a brake pad and a brake disc, thereby preventing drag torque from being generated between the brake pad and the brake disc. The drag torque causes a reduction in fuel efficiency of a vehicle and premature wear of the brake pad. Accordingly, in the method of controlling the electronic parking brake according to one embodiment of the present disclosure, the drag torque is not generated in the electronic parking brake release process, thereby increasing fuel efficiency of the vehicle and preventing premature wear of the brake pad.

Figure 2:
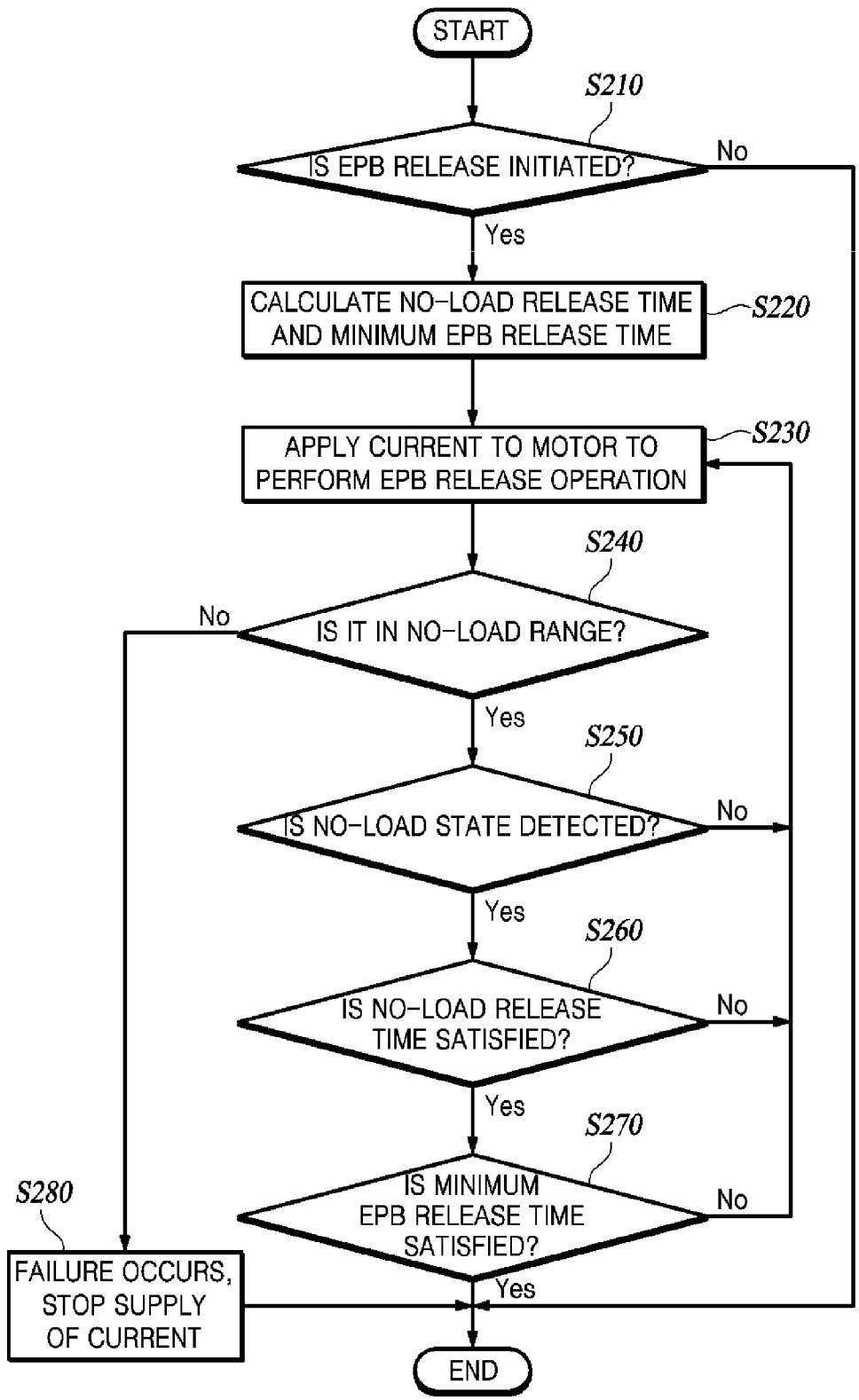
FIG. 2 is a flowchart illustrating an algorithm for an electronic parking brake control process according to one embodiment of the present disclosure.

FIG. 2 is a flowchart illustrating an algorithm for an electronic parking brake control process according to one embodiment of the present disclosure.

Referring to FIG. 2, a unit electronic control (ECU) (not shown) determines whether to initiate an operation of releasing the electronic parking brake (S210).

When a release signal is input, the ECU initiates the operation of releasing the electronic parking brake. Here, the release signal may indicate, for example, a case in which a parking brake release button is pressed by a driver, or the like.

When the operation of releasing the electronic parking brake is initiated, a no-load release time and a minimum EPB release time are calculated (S220). A process of calculating the no-load release time and a process of calculating the minimum EPB release time will be described in more detail in FIG. 3.

When the calculations are completed, the ECU applies current to a motor to release an EPB piston (S230). That is, the ECU rotates the motor in a reverse direction by flowing the current to the motor so that the EPB piston moves back.

When the release of the electronic parking brake is initiated, the process enters a load state in which a brake pad and a brake disc are in contact with each other.

In order to start the backward movement of the EPB piston connected to the electronic parking brake, the motor is driven in the reverse direction so that the piston moves back. Here, the time corresponding to a load section is inversely proportional to a magnitude of a release fluid pressure acting on a main brake. For example, the larger the release fluid pressure acting on the main brake, the shorter the load section. The expression "the shorter the load section" means that the EPB release time is reduced. That is, when hydraulic pressure acting on the main brake is large, the load section is shortened, thereby reducing the EPB release time.

When the EPB release time is reduced, a sufficient air gap may not be formed between the brake pad and the brake disc. When the air gap is insufficient, since friction may be generated between the brake pad and the brake disc when the vehicle is driven, wear (drag) occurs on the brake pad. The wear of the brake pad caused by the drag torque reduces a braking force, thereby not only lowering braking performance but also lowering the fuel efficiency of the vehicle.

In the control method according to one embodiment of the present disclosure, the operation of releasing the electronic parking brake is maintained by flowing current to the motor until the no-load release time condition (S260) and the minimum EPB release time condition (S270) are satisfied, and thus a phenomenon in which the air gap is insufficient does not occur.

When the current starts to flow through the motor, the ECU determines whether a no-load range is normally set (S240). The expression "the no-load range is normally set" refers to a case in which the current flowing through the motor is greater than or equal to a first set value and is less than or equal to a second set value. For example, it refers to a case in which the current flowing through the motor is preset to 0.2 A to 3 A for the no-load range. When the current flowing through the motor exceeds the second set value, it is determined to be the load section. When the current flowing through the motor is less than the first set value, it is determined that the electronic parking brake release process is terminated.

When it is determined that the no-load range has not been normally set, it is determined that a failure has occurred, and the supply of the current to the motor is stopped and the electronic parking brake release process is terminated (S280).

On the other hand, when it is determined that the no-load range is normally set, the ECU determines whether it is a no-load state based on the current flowing through the motor (S250).

In the detailed description of the present disclosure, the load section refers to a state in which the brake pad is in contact with the brake disc, and a no-load section refers to a state in which the brake pad is not in contact with the brake disc.

In the load section, a load current greater than or equal to a driving current is generated in an actuator (not shown) because the brake pad is in contact with the brake disc. On the other hand, in the no-load section, only the driving current for driving the actuator is generated because the brake pad is not in contact with the brake disc. That is, the load current greater than the driving current flows through the motor when the electronic parking brake is released, but only the driving current flows from the moment when the brake pad is separated from the brake disc.

When the current flowing through the motor is determined to be outside the no-load range, that is, when the brake pad is in a state of being in contact with the brake disc, the ECU continuously supplies current so that the brake pad is separated from the brake disc.

On the other hand, when the current flowing through the motor is determined to be in the no-load range, that is, when the brake pad is separated from the brake disc, the ECU supplies current until the calculated no-load release time is satisfied. The ECU measures the time for which the current is supplied in the no-load section while supplying the current, and determines whether the measured time satisfies the no-load release time (S260).

In order to determine whether the no-load release time is satisfied, the ECU determines the time for which the current flows in the no-load range based on a value of the current flowing through the motor. For example, when the time for which a current of 0.2 A to 3 A flows is 1.1 s, the ECU determines that the no-load release time is 1.1 s. Here, "s" refers to seconds.

The ECU compares the calculated no-load release time, for example, 1.2 s and the measured no-load release time, for example, 1.1 s, and when the measured no-load release time is less than the calculated no-load release time, the ECU performs an adjustment operation of adding as much time as the time difference to the no-load release time. For example, when the no-load release time is short by 0.1 s, the ECU supplies more current to the motor for a time period of 0.1 s to move the EPB piston further back.

When the no-load release time is satisfied, the ECU determines whether the minimum EPB release time calculated in process S220 is satisfied (S270).

For example, when the minimum EPB release time is not satisfied even though the no-load release time is adjusted, the ECU performs an adjustment operation of adding as much time as the insufficient time to the EPB release time. For example, when the no-load release time is adjusted by 0.1 s but the measured EPB release time, e.g., 1.3 s (load release time 0.1 s+no-load release time 1.2 s), is determined not to satisfy the minimum EPB release time calculated in process S220, e.g., 1.4 s, the EPB piston is further moved back by a distance corresponding to a time period of 0.1 s.

In the control method according to one embodiment of the present disclosure, the electronic parking brake release process is terminated only when the no-load release time condition and the minimum EPB release time condition are simultaneously satisfied.

When the algorithm is configured such that the ECU terminates the electronic parking brake release process as long as the no-load release time condition is satisfied, in a case in which the release fluid pressure of the main brake is increased and the load release time is reduced, for example, reduced from 0.4 s to 0.1 s, even when the no-load release time condition, e.g. 1.2 s, is satisfied, the measured EPB release time, e.g., 1.3 s (0.1 s+1.2 s), is less than time to form a sufficient air gap, e.g., 1.4 s, and thus, the air gap is still insufficient and the wear of the brake pads may not be prevented.

Accordingly, in the control method according to one embodiment of the present disclosure, the electronic parking brake release process is terminated only when the no-load release time condition and the minimum EPB release time condition are simultaneously satisfied, thereby achieving the EPB release time to the extent that a sufficient air gap is secured. Thus, in one embodiment of the present disclosure, there is an effect of improving fuel efficiency of the vehicle and preventing premature wear of the brake pad by reducing the drag torque.

When it is determined that both the no-load release time and the EPB release time are satisfied, the algorithm ends.

Figure 3:
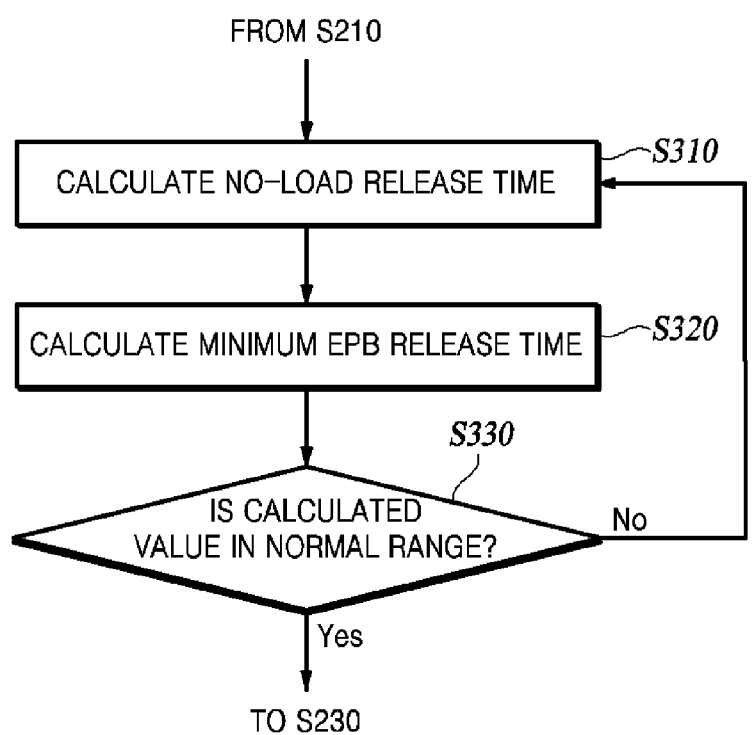
FIG. 3 is a flowchart for determining a no-load release time and a minimum EPB release time according to one embodiment of the present disclosure.

FIG. 3 is a flowchart for determining the no-load release time and the minimum EPB release time according to one embodiment of the present disclosure.

Referring to FIG. 3, when the operation of releasing the electronic parking brake is initiated, the ECU calculates the no-load release time based on a voltage applied to the motor (S310). Here, the no-load release time may be a predetermined value, and the predetermined value may be tuned. For example, when the ECU determines that a voltage of 14.5 V is applied to the motor, the ECU determines the no-load release time as 1.15 s.

In addition, the ECU may calculate the no-load release time based on a release clamping force formed in the main brake in addition to the method of calculating the no-load release time based on the voltage. The process of calculating the release time includes a process of calculating an adjustment value for the no-load release time.

Here, the adjustment value may be a predetermined value, and the predetermined value may be tuned. For example, the adjustment value may be set to 0.1 s when the release fluid pressure is 10 bar, and the adjustment value may be set to 0.2 s when the release fluid pressure is 30 bar.

However, in the control method according to one embodiment of the present disclosure, the adjustment value may be differently set according to the release fluid pressure, but a case in which a constant adjustment value is set regardless of the release fluid pressure is included. When explain the reason in more detail, in a conventional electronic parking brake control method, when the electronic parking brake is released in a state in which a maximum clamping force is formed in the brake, even when the hydraulic pressure of the main brake is, for example, 20 bar or more, the air gap becomes 0.5 mm or less after the parking brake is released. That is, in the conventional electronic parking brake control method, the adjustment is required in the entire hydraulic pressure range, and the larger the hydraulic pressure of the main brake, the larger the adjustment value.

However, in the method of controlling the electronic parking brake according to one embodiment of the present disclosure, a constant adjustment value is set regardless of the magnitude of the release fluid pressure. This is because in the method of controlling the electronic parking brake according to one embodiment of the present disclosure, since the magnitude of the release fluid pressure is large, even when the load release time is shortened, the release of the electronic parking brake is not completed until the EPB release time condition is satisfied. Thus, a problem of terminating the release of the electronic parking brake does not occur even when the EPB release time does not satisfy the time for forming a sufficient air gap.

As a result, in the method of controlling the electronic parking brake according to one embodiment of the present disclosure, by adding a condition that the release of the electronic parking brake is terminated only when the minimum EPB release time is satisfied, even when the load release time is shortened, an air gap of 0.5 mm or more may always be secured. In other words, in the conventional electronic parking brake control method, a hydraulic pressure adjustment logic is not effective because the adjustment is required in the entire hydraulic pressure range, but in the method of controlling the electronic parking brake according to one embodiment of the present disclosure, there is an effect that only the minimum EPB release time needs to be set for each vehicle because the no-load release time is calculated and a constant hydraulic pressure value is set regardless of the magnitude of the release fluid pressure.

After calculating the no-load release time, the ECU calculates the minimum EPB release time based on the voltage applied to the motor (S320). Here, the minimum EPB release time may be a predetermined value, and the predetermined value may be tuned. For example, when the ECU determines that a voltage of 14.5 V is applied to the motor, the ECU determines the minimum EPB release time as 1.25 s. In addition, when the minimum EPB release time is calculated in process S320, the minimum EPB release time is calculated based on the clamping force of the electronic parking brake.

Meanwhile, the ECU may calculate the minimum EPB release time based on the voltage applied to the motor, but may calculate the minimum EPB release time based on the clamping force of the electronic parking brake. For example, when the ECU determines that the clamping force of the electronic parking brake is 8.5 A, the ECU determines the minimum EPB release time as 1.25 s.

When the calculation processes are completed, the ECU performs a process of determining whether the calculated values are in a normal range (S330).

The ECU may compare the calculated values with a preset value to determine whether the calculated values are in the normal range, and when it is determined that the calculated values are out of the normal range, the ECU calculates the no-load release time and the minimum EPB release time again.

On the other hand, when the ECU determines that the calculated values are in the normal range, process S230 of FIG. 2 is performed.

FIG. 4 is a table illustrating situations of an air gap, which is generated in the electronic parking brake, according to the magnitude of each of the clamping force and the release fluid pressure when the no-load release time is not adjusted.

Referring to FIG. 4, the situations of the air gap, in which the motor current required to maintain the clamping force of the electronic parking brake is divided into cases of 8.5 A, 6 A, and 4 A, are illustrated.

Figure 5A:
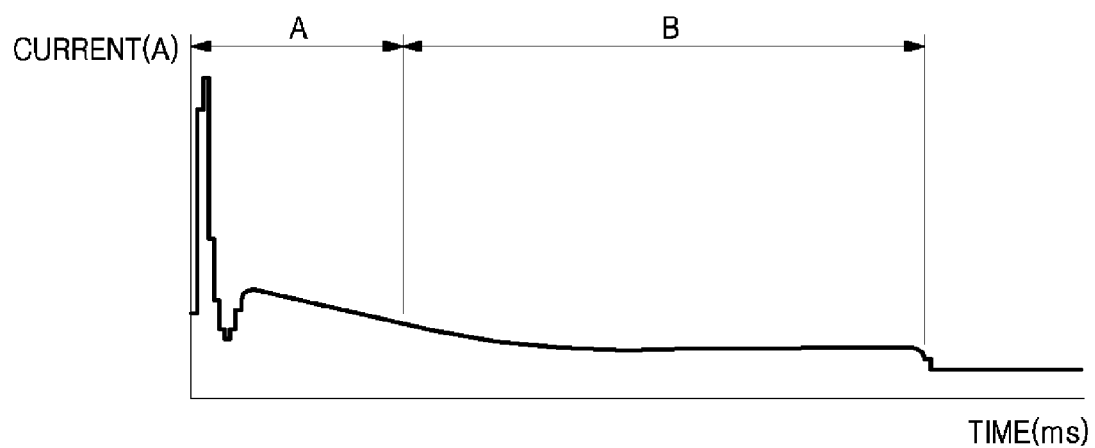
FIGS. 5A and 5B are a set of graphs illustrating a conventional electronic parking brake release process in terms of time and current.
Figure 5B:
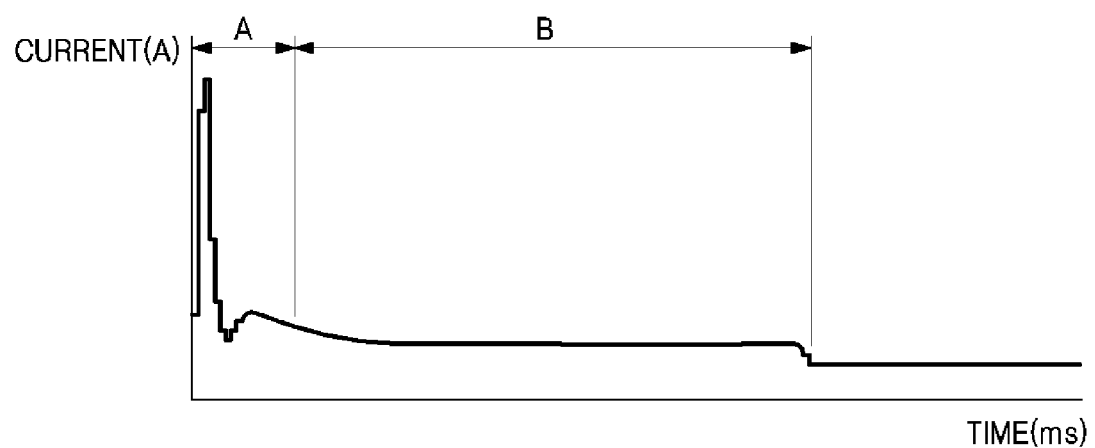

The larger the clamping force at a time point at which the electronic parking brake release is initiated, the larger the influence of hydraulic pressure. That is, as the clamping force is increased, the release time is shortened. In addition, the larger the magnitude of the hydraulic pressure at the same clamping force, the smaller the release time. This is because, as described above, when the release fluid pressure is large, a length of the load section, that is, section A of FIG. 5, is shortened, and thus the EPB release time is shortened.

As a result, when the EPB is released, that is, in process S320, the ECU calculates the minimum EPB release time based on the clamping force formed in the electronic parking brake.

Further, as the EPB release time increases, a sufficient air gap may be formed.

When the motor current required to maintain the clamping force is 8.5 A, the air gap is less than or equal to 0.5 mm as long as the release fluid pressure is greater than or equal to 20 bar. An air gap of at least 0.5 mm should be maintained so that drag torque is not generated between the brake pad and the brake disc. Thus, in the adjustment process according to one embodiment of the present disclosure, the no-load release time is adjusted by adding the constant adjustment value described in FIG. 3 so that a sufficient air gap may be secured in the electronic parking brake.

As described above, according to the present embodiment, when an electronic parking brake is released, a motor can be rotated to move a piston back until a no-load release time is maintained for a predetermined time or longer and an EPB release time is maintained for a predetermined time or longer, thereby securing a sufficient air gap between a brake pad and a brake disc. By securing a sufficient air gap to eliminate drag torque, there is an effect of improving fuel efficiency of a vehicle and preventing premature wear of a brake pad.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A method of controlling an electronic parking brake, the method comprising:
    an initiation determination process of determining whether to initiate an electronic parking brake (EPB) release operation based on whether a release signal is input;
    a calculation process of calculating a no-load release time and a minimum EPB release time when the EPB release operation is initiated;
    a no-load release time adjustment process of measuring a time of a no-load section based on a current flowing through a motor and adjusting the time of the no-load section by supplying the current to the motor until the time of the no-load section is equal to the calculated no-load release time; and
    a release process of determining whether a summed time of a time of a load section and the adjusted time of the no-load section satisfies the minimum EPB release time, and, upon determining that the summed time is less than the minimum EPB release time, continuously supplying the current to the motor for a time difference between the summed time and the minimum EPB release time until the summed time becomes equal to the EPB release time.

2. The method of claim 1, wherein, in the calculation process, the minimum EPB release time is calculated based on a voltage applied to the motor.

3. The method of claim 1, wherein, in the calculation process, the minimum EPB release time is calculated based on a clamping force of the electronic parking brake.

4. The method of claim 1, wherein, in the calculation process, the no-load release time is calculated based on a voltage applied to the motor.

5. The method of claim 1, wherein, in the no-load release time adjustment process, different adjustment values for the no-load release time are predetermined based on a release fluid pressure of a main brake.

6. The method of claim 1, wherein, in the no-load release time adjustment process, a constant adjustment value for the no-load release time is predetermined regardless of a magnitude of a release fluid pressure of a main brake.

7. The method of claim 1, wherein, in the no-load release time adjustment process,
    the no-load section is determined when the current flowing through the motor is greater than or equal to a first set value and less than or equal to a second set value,
    the load section is determined when the current flowing through the motor exceeds the second set value, and the release process is determined to be terminated when the current flowing through the motor is less than the first set value.

* * * * *